United States Patent [19]
Herbolzheimer et al.

[11] Patent Number: 5,348,982
[45] Date of Patent: Sep. 20, 1994

[54] SLURRY BUBBLE COLUMN (C-2391)

[75] Inventors: Eric Herbolzheimer, Annandale; Enrique Iglesia, Clinton, both of N.J.

[73] Assignee: Exxon Research & Engineering Co., Florham Park, N.J.

[21] Appl. No.: 63,969

[22] Filed: May 20, 1993

Related U.S. Application Data

[63] Continuation of Ser. No. 929,084, Aug. 12, 1992, abandoned, which is a continuation of Ser. No. 732,244, Jul. 18, 1991, abandoned, which is a continuation of Ser. No. 504,746, Apr. 4, 1990, abandoned.

[51] Int. Cl.$^5$ .............................................. C07C 1/04
[52] U.S. Cl. ................................................... 518/700
[58] Field of Search .......................................... 518/700

[56] References Cited

U.S. PATENT DOCUMENTS 2,671,103 3/1959 Kolbel et al. .
4,857,559 8/1989 Eri et al. .

OTHER PUBLICATIONS

Perry et al., Chemical Engineers Handbook, 5th Ed., McGraw Hill Book Co., NY, 4–16 to 4–18, 1973
Kobel et al., Fischer Tropath Synthesis is Liquid Phase; Catal. Rev.-Sci Eng. 21 (2) 225–274 (1980).
Shah et al., AI Ch E Journal, 28 No. 3, pp. 353–378, May 1982.

*Primary Examiner*—Howard T. Mars
*Attorney, Agent, or Firm*—Ronald D. Hartman

[57] ABSTRACT

The present invention is a method for optimally operating a three phase slurry bubble column. The constituents of the three phases, gas, liquid, and solids, are determined by the chemical reaction in the column. The method includes injecting the gas phase into the column with an appropriate velocity so that the solid phase is fluidized while still maintaining "plug flow" over the column length.

16 Claims, 8 Drawing Sheets

SLURRY BUBBLE COLUMN (C-2391)

CROSS REFERENCE TO RELATED APPLICATIONS

This application is a continuation of U.S. Ser. No. 929,084, filed Aug. 12, 1992, now abandoned, which is a continuation of U.S. Ser. No. 732,244, filed Jul. 18, 1991, now abandoned, which is a continuation of U.S. Ser. No. 504,746, filed Apr. 4, 1990, now abandoned.

BACKGROUND OF THE INVENTION

The present invention relates to the optimal operation of a slurry bubble column reactor. Such columns have three phases in which solid catalyst particles are held in suspension in a liquid phase by bubbling gas phase reactants.

Slurry bubble column reactors operate by suspending catalytic particles in a liquid and feeding gas phase reactants into the bottom of the reactor through a gas distributor which produces small gas bubbles. As the gas bubbles rise through the reactor, the reactants are absorbed into the liquid and diffuse to the catalyst where, depending on the catalytic system, they can be converted to both liquid and gaseous products. If gaseous products are formed, they enter the gas bubbles and are collected at the top of the reactor. Liquid products are recovered by passing the slurry through a filter which separates the liquid from the catalytic solids. A principal advantage of slurry reactors over fixed bed reactors is that the presence of a circulating/agitated slurry phase greatly increases the transfer rate of heat to cooling surfaces built into the reactor. Because reactions of interest are often highly exothermic, this results in reduced reactor cost (less heat transfer equipment is needed) and improved stability during reactor operations. A distinct advantage of bubble columns over mechanically stirred reactors is that the required mixing is effected by the action of rising bubbles, a process significantly more energy-efficient than mechanical stirring.

In any reaction, the rate of conversion of reactants to products and the product selectivity depend on the partial pressure of the reactants in contact with the catalyst. Thus, the mixing characteristics of the reactor become critical in determining catalyst performance because they will determine the gas phase composition (and therefore, the partial pressure of the reactants) at any particular axial position in the reactor.

In fully backmixed reactors (CSTR), the composition of reactants (gaseous) and products (liquids and gases) and condition of the catalyst is identical at every point within the reactor. The reactant concentration (or gas partial pressure) controls catalyst performance by providing the driving force for the reaction and determines the conversion occurring in the reactor. Thus, even though pure reactant feed is entering the reactor, catalyst performance is driven by the uniform reactant gas phase concentration present throughout the reactor and equal to the reactant gas phase concentration exiting the reactor. This fully backmixed system has a low relative productivity per volume of reactor for any reactions having positive pressure order rate kinetics.

The other extreme in reactor mixing occurs in plug flow reactors where the catalyst is stationary relative to the flow of reactants and products (liquids and gases). The feed undergoes reaction as it enters the reactor and the reaction continues as the unreacted feed proceeds through the reactor. Thus, the concentration and partial pressure of reactants decrease along the path of the reactor; therefore, the driving force of the reaction also decreases as the concentration of liquid and gaseous products increase. Thus, the catalyst at the exit portion of the plug flow reactor never sees fresh feed. The plug flow system provides maximum productivity for a given reactor volume for any reactions showing positive pressure order kinetics.

The important difference between the CSTR and plug flow reactor systems is that the gas phase reactant concentrations that provide the kinetic driving force for the reaction differ significantly. In the fully backmixed system, the reactant concentration is the same at every point in the reactor; in the plug flow system, the reactant concentration steadily decreases along the path of the catalyst bed from inlet to outlet and the reaction rate is obtained by integrating the rate function from inlet to outlet. Because the reactant concentration at any point in a CSTR system always corresponds to outlet conditions, the productivity in a fully backmixed system will always be lower than the productivity in a plug-flow system for reactions with positive pressure order kinetics.

Reactor systems exhibiting plug-flow and well stirred characteristics represent extremes in reactor performance. In practice, plug-flow reactors may exhibit some backmixed traits and backmixed reactors may exhibit some plug-flow traits. Deviations from the ideal systems are due to the dispersion of the reactant gases in the reactor. Extent of backmixing is a function of the mechanical energy imparted to the system. The reactor geometry also affects backmixing and small L/d (i.e., reactor length to reactor diameter) ratios, less than 3, favor complete backmixing. However, higher energy input reactors with greater L/d can also achieve complete backmixing. Conversely, plug-flow behavior is favored by high L/d ratios. The degree of backmixing that can occur in a plug-flow reactor can be represented by the Peclet number, Pe. (See Carberry, J. J., "Chemical and Catalytic Reaction Engineering", McGraw-Hill, 1976, or Levenspiel, O., "Chemical Reaction Engineering", Wiley, 1972.)

High Peclet numbers, e.g., greater than 10, lead to plug-flow behavior while low Peclet numbers, e.g., less than 1, correspond to well-mixed systems and are typical of CSTR's. By definition, the dispersion coefficient for an ideal CSTR is infinity and the Peeler number approaches zero.

These considerations show that the scale-up of slurry reactors from laboratory to commercial units is not straightforward. For example, as the reactor vessel is made taller, the height to which the catalyst is fluidized is likely not to increase proportionally or at all, and the added reactor volume remains unused. Also, as the reactor diameter increases, the mixing intensity increases and may result in an increase in the fluidization height but could also increase the Peclet number and move the reactor performance from plug-flow to well-mixed with a corresponding decrease in conversion of products to reactants.

This difficulty is obvious in previous attempts to apply slurry reactors to the important process of Fischer-Tropsch synthesis of hydrocarbons (predominantly $C_{10}+$) from synthesis gas (carbon monoxide and hydrogen) using iron catalysts. The sole previous scale-up efforts reported in the literature for commercial size units (5 ft. diameter) were the Rheinpreussen tests in the 1950's (see H. Storch, N. Columbis, R. B. Anderson, "Fischer-Tropsch and Related Synthesis", Wiley (1951) New York and J. Falbe, "Advances in Fischer-Tropsch Catalysis", Verlag (1977) Berlin). Moving from laboratory to commercial units, they sequentially built systems in which the dispersion was too low to adequately fluidize the particles to systems with dispersions high enough to cause backmixed reactor behavior in the commercial size reactor. To date, the optimal implementation of large scale systems has not been achieved or described. A methodology for such a scale-up process is described in this invention.

Optimum performance of slurry bubble column reactors requires adequate fluidization of the catalyst particles while minimizing backmixing of the reactants in the gas phase. If the conditions in the reactor are such that the particles settle, difficulties arise because the reaction zone is short. Then in order to achieve high conversions, the reaction rate per volume must be very high and the catalyst can easily become starved of reactants because of limitations in the rate at which reactants can be transferred from the gas bubbles to the particles suspended in the liquid. This condition results in poor catalyst utilization, poor reaction selectivity, and eventually to catalyst deactivation. Also, for exothermic reactions, the heat release takes place in the short reaction zone, imposing severe requirements on the heat transfer equipment.

The tendency of the particles to settle can be overcome, however, by maximizing the dispersion effects resulting from the rising gas bubbles and from the mixing patterns that they induce. These dispersion effects can be enhanced by increasing either the effective reactor diameter or the flow rate of gas through the reactor. If the dispersion is increased too much, however, the gas phase will also become well mixed and the reactor performance will change from that of a plug flow reactor to that of a backmixed reactor.

Eri et al in U.S. Pat. No. 4,857,559 have discussed the relative merits of operating a Fischer-Tropsch reactor with a feed gas containing various levels of diluents such as methane, carbon dioxide, and nitrogen. In fixed bed reactors, they have indicated that the presence of a diluent such as nitrogen in the feed is disadvantageous since it will increase the pressure drop across the reactor bed. In a slurry or fluidized bed reactor they indicate that diluent has beneficial effects, in that it provides additional mixing energy to the system to keep the catalyst suspended. Moreover they note that added diluent will not have a great effect on pressure drop in the slurry or fluidized bed reactors.

Eri et al also indicated that diluents will have a disadvantageous effect on the fixed bed reactor since it will, at constant overall pressure, lead to a net reduction in the partial pressure of reactant gases present with a concomitant net reduction in the overall volumetric productivity of the system. They failed to indicate, however, that a similar reduction in productivity would result in slurry or fluidized bed reactors as the diluent reduces the reactant gas partial pressure. Consequently, the improved catalyst fluidization achieved with added diluent is offset by the reduced productivity and subsequent diluent processing steps associated with product recovery.

The preferred embodiment of the present invention is the Fischer-Tropsch synthesis of hydrocarbons using CO catalysts. The Fischer-Tropsch reaction involves the catalytic hydrogenation of carbon monoxide to produce a variety of products ranging from methane to higher aliphatic alcohols, The methanation reaction was first described by Sabatier and Senderens in 1902. The later work by Fischer and Tropsch dealing with higher hydrocarbon synthesis (HCS) was described in Brennstoff-Chem, 7, 97 (1926).

The reaction is highly exothermic and care must be taken to design reactors for adequate heat exchange capacity as well as for their the ability to continuously produce and remove the desired range of hydrocarbon products. The process has been considered for the conversion of carbonaceous feedstocks, e.g., coal or natural gas, to higher value liquid fuel or petrochemicals. The first major commercial use of the Fischer-Tropsch process was in Germany during the 1930's. More than 10,000 B/D (barrells per day) of products were manufactured with a cobalt based catalyst in a fixed-bed reactor. This work has been described by Fischer and Pichler in Ger. Pat. No. 731,295 issued Aug. 2, 1936.

Commercial practice of the Fischer-Tropsch process has continued in South Africa in the SASOL plants. These plants use iron based catalysts and produce gasoline in fluid-bed reactor and wax in fixed-bed reactors.

Research aimed at the development of more efficient CO hydrogenation catalysts and reactor systems is continuing. In particular, a number of studies describe the behavior of iron, cobalt or ruthenium based catalysts in slurry reactors together with the development of catalyst compositions and improved pretreatment methods specifically tailored for that mode of operation.

Farley et al in The Institute of Petroleum, vol. 50, No. 482, pp. 27–46, February (1984), describe the design and operation of a pilot-scale slurry reactor for hydrocarbon synthesis. Their catalysts consisted of precipitated iron oxide incorporating small amounts of potassium and copper oxides as promoters. These catalysts underwent both chemical and physical changes during activation with synthesis gas in the slurry reactor.

Slegeir et al in Prepr. ACS Div. Fuel Chem, vol. 27, p. 157-163 (1982), describe the use of supported cobalt catalysts for the production of hydrocarbons from synthesis gas at pressures above 500 psi in a CSTR slurry reactor.

Rice et al in U.S. Pat. No. 4,659,681 issued on Apr. 21, 1987, describe the laser synthesis of iron based catalyst particles in the 1–100 micron particle size range for use in a slurry Fischer-Tropsch reactor.

Dyer et al in U.S. Pat. No. 4,619,910 issued on Oct. 28, 1986, and U.S. Pat. No. 4,670,472 issued on Jun. 2, 1987, and U.S. Pat. No. 4,681,867 issued on Jul. 21, 1987, describe a series of catalysts for use in a slurry Fischer-Tropsch process in which synthesis gas is selectively converted to higher hydrocarbons of relatively narrow carbon number range. Reactions of the catalyst with air and water and calcination are specifically avoided in the catalyst preparation procedure. Their catalysts are activated in a fixed-bed reactor by reaction with $CO+H_2$ prior to slurrying in the oil phase in the absence of air.

Fujimoto et al in Bull. Chem. Soc. Japan, vol. 60, pp. 2237–2243 (1987), discuss the behavior of supported ruthenium catalysts in slurry Fischer-Tropsch synthesis. They indicate that the catalyst precursors were ground to fine powders (<150 mesh), calcined if needed, and then activated in flowing hydrogen before addition to a degassed solvent and subsequent introduction to the slurry reactor.

SUMMARY OF THE INVENTION

The present invention is a method for optimally designing and operating a three-phase slurry bubble column reactor. The constituents of the three phases, gas, liquid, and solids, are defined by the desired chemical reaction. The method includes injecting the gas phase into a column of a given diameter in such a way as to provide substantial absence of slug flow and with an appropriate velocity so that the solid phase is fluidized while still maintaining "plug flow" reactor behavior over the column length.

DESCRIPTION OF THE PREFERRED EMBODIMENT

The optimal operation of a slurry bubble column reactor requires that the solid phase be fluidized in the liquid phase over the entire height of the column. The solid phase is fluidized by upward forces caused by rising gas bubbles and acting against the tendency of the particles to settle under the downward gravitational force.

Generally, the catalyst powders employed in this invention comprise a Group VIII metal such as iron, cobalt or ruthenium or mixtures thereof on an inorganic oxide support. These catalysts may contain additional promoters comprising Group I, Group II, Group V, or Group VII metals alone or in combination. The preferred catalyst powders of this invention comprise cobalt or cobalt and thoria on an inorganic oxide support containing a major amount of titania, silica or alumina. The catalyst may also contain a promoter metal, preferably rhenium, in an amount sufficient to provide a catalyst having a rhenium:cobalt weight ratio greater than about 0.01 to 1, preferably 0.025:1 to about 0.1 to 1. The catalyst contains about 2 to 50 wt % cobalt, preferably 5 to 20 wt % cobalt.

The catalyst metals are supported on an inorganic refractory oxide comprising titania, silica or alumina. Preferably, the support material is comprised of major amounts of titania and more preferably the titania has a rutile:anatase ratio of at least about 2:3 as determined by x-ray diffraction (ASTM D2730-78), preferably about 2:3 to about 100:1 or higher, more preferably about 4:1 to 100:1 or higher, e.g., 100% rutile. The surface area of the preferred support is, generally, less than about 50 $m^2/gm$ (BET).

Cobalt-rhenium/titania catalysts exhibit high selectivity in the synthesis of hydrocarbon liquids from carbon monoxide and hydrogen. The catalysts employed in the practice of this invention may be prepared by techniques known in the art for the preparation of other catalysts. The catalyst powder can, e.g., be prepared by gellation, or cogellation techniques. Suitably, however, the metals can be deposited on a previously pilled, pelleted, beaded, extruded, or sieved support material by the impregnation method. In preparing catalysts, the metals are deposited from solution on the support in preselected amounts to provide the desired absolute amounts, and weight ratio of the respective metals, cobalt and rhenium. Suitably, the cobalt and rhenium are composited with the support by contacting the support with a solution of a cobalt containing compound, or salt, or a rhenium-containing compound, or salt, e.g., a nitrate, carbonate or the like. Optionally, the cobalt and rhenium can be coimpregnated on the support. The cobalt and rhenium compounds used in the impregnation can be any organometallic or inorganic compounds which decompose upon heating in nitrogen, argon, helium or other inert gas, calcination in an oxygen containing gas, or treatment with hydrogen at elevated temperatures to give the corresponding metal, metal oxide, or mixtures of the metal and metal oxide phases, of cobalt and rhenium. Cobalt and rhenium compounds such as the nitrate, acetate, acetylacetonate, naphthenate, carbonyl, or the like can be used. The amount of impregnation solution should be sufficient to completely wet the carrier, usually within the range from about 1 to 20 times of the carrier by volume, depending on the metal, or metals, concentration in the impregnation solution. The impregnation treatment can be carried out under a wide range of conditions including ambient or elevated temperatures.

The catalyst, after impregnation, is dried by heating at a temperature above 30° C., preferably between 30° C. and 125° C., in the presence of nitrogen, or oxygen, or both, or air, in a gas stream or under partial vacuum.

The catalyst particles, if necessary, are converted to the desired particle size range of nominally 1–200 microns average diameter by crushing, ultrasonic treatment, or other methods known to those skilled in the art. The material can then be sieved, if necessary, to produce a powder that is predominantly within the desired particle size range.

The slurry liquid used in the process is a liquid at the reaction temperature, must be relatively or largely or significantly chemically inert under the reaction conditions and must be a relatively good solvent for CO/hydrogen and possess good slurrying and dispersing properties for the finely divided catalyst. Representative classes of organic liquids which can be utilized are high boiling paraffins, olefins, aromatic hydrocarbons, alcohols, ethers, amines, or mixtures thereof. The high boiling paraffins include $C_{10}$-$C_{50}$ linear or branched paraffinic hydrocarbons; the olefins include poly x-olefin liquids; the aromatic hydrocarbons include $C_2$-$C_{20}$ single ring and multi and fused ring aromatic hydrocarbons; the ethers include aromatic ethers and substituted aromatic ethers where the ether oxygen is sterically hindered from being hydrogenated; the amines include long chain amines which can be primary, secondary, and tertiary amines, wherein primary amines preferably contain at least a $C_{12}$ alkyl group in length, secondary amines preferably contain at least two alkyl groups being $C_7$ or greater in length, and tertiary amines preferably contain at least three alkyl groups being $C_6$ or higher in length. The slurry liquid can contain N and O in the molecular structure but not S, P, As or Sb, since these are poisons in the slurry process. Representative examples of specific liquid slurry solvents useful are dodecane, tetradecane, hexadecane, octadecane, cosane, tetracosane, octacosane, dotriacontane, hexatriacontane, tetracontane, tetratetracontane, toluene, o-, m-, and p-xylene, mesitylene, $C_1$-$C_{12}$ mono- and multialkyl substituted benzenes, dodecylbenzene, naphthalene, anthracene, biphenyl, diphenylether, dodecylamine, dinonylamine, trioctylamine, and the like. Preferred liquid hydrocarbon slurry solvent is octacosane or hexadecane. (Most preferred really is HCS wax, i.e., the product of the FT reaction.)

In addition to CO hydrogenation, the improved process of the present invention can be applied to hydrogenation, aromatization, hydrodesulfurization, hydrodenitrogenation, resid hydroprocessing, hydroforminglation and related reactions. These are described in more detail in "Applied Heterogenerous Catalysis", J. F. LePage et al, Editions Tecnip Paris (1987).

The height to which the catalyst can be fluidized is given by $D/(U_s-U_L)$ where D is the dispersion coefficient for the particles, $U_s$ is the particle settling velocity (see Example 2) and $U_L$ is the liquid velocity along the column. This liquid flow along the column may be produced by removing liquid from the top of the reactor at a rate equal to the liquid product production rate plus any extra liquid which is injected back into the bottom of the reactor as liquid recycle. While such liquid recycle can enhance the fluidization height it is usually an undesirable operating mode because the pumps and added filters greatly add to the construction and operating costs and to the complexity of operating procedures of the reactor. If this fluidization height exceeds the actual physical height of the reactor, the catalyst concentration becomes more uniform than is necessary for efficient operation. Hence, excellent reactor performance can be achieved when the reactor is designed and the operating conditions are picked such that $H=D/(U_s-U_L)$ or $D=H(U_s-U_L)$, where H is the expanded height of the liquid in the column.

This ability to fluidize the particles arises from mixing induced by the gas bubbles and, therefore, at the expense of some backmixing of the reactants. Plug-flow behavior can still be achieved, however, because for gas mixing the importance of the dispersion must be compared to $U_g$, the gas velocity, rather than to the particle settling velocity $U_s$. Specifically, the degree of backmixing of the gas is measured by the Peclet number, defined by $Pe=U_g H/D$. If the dispersion is maintained at that just required to fluidize the particles (i.e., if the reactor conditions are such that $D \approx 0.5H(U_s-U_L)$, then $Pe=U_g/(U_s-U_L) >> 1$ and plug flow behavior will prevail. In practical terms, this requires a design with intermediate values of the reactor diameter and gas velocity. Low particle settling velocities increase the window of acceptable operating parameters but is not by itself a necessary condition for good performance (see Example 7).

It is the object of the present invention to avoid the need for substantial quantities of diluent in the reactant feed gas stream, while simultaneously operating with a well suspended catalyst bed in a plug flow mode. This will not only lead to substantially higher productivity per unit volume of reactor space, but also eliminate the need to first produce and then separate diluent from products and various reactant gas recycle streams. All of these factors lead to energy and investment savings, thereby improving the overall economic attractiveness of the process.

While these are the primary constraints for efficient reactor performance, there are auxiliary conditions important in scale-up. For example, the total reactor volume must be controlled to yield the desired conversion rate of reactants to products for the intrinsic catalyst activity. This normally sets a minimum height for the reaction zone (i.e., minimum liquid and fluidization height) for economic reactor operation. Also, while making the catalyst particles smaller improves the fluidization it also greatly increases the difficulty in separating them from the liquid product stream. Hence, catalyst particle diameters of less than 5 microns should be avoided. A more preferred diameter is greater than 30 microns. Finally, if the effective reactor diameter is too small, the flow regime has large gas slugs (i.e., slug flow) rising through the column rather than a dispersion of small gas bubbles typical of bubbly or churn turbulent flow which give better mass transfer performance. Hence, bubble column diameters of less than 10 cm should not be used for either obtaining data for scaleup or for commercial units (see Gas-Liquid-Solid Fluidization Engineering, Liang-Shih Fan, Butterworths, Boston (1989)). Reactors with small effective diameters also can lead to unreasonable complexity and construction cost when designed for systems large enough to convert commercial feed rates of reactants.

EXAMPLE 1

Figure 1:
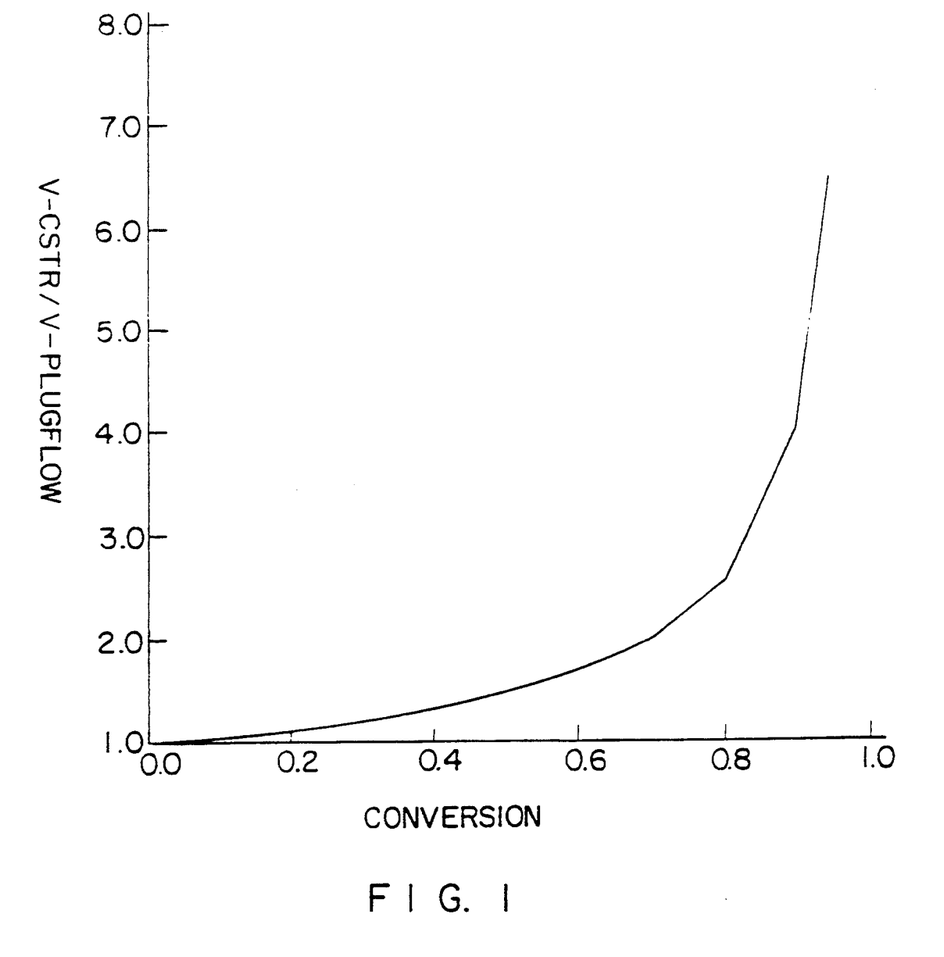
FIG. 1 shows a comparison of the volume needed for plug-flow and well-mixed reactors in order to achieve a given conversion.

Comparison of Reactor Volume Needed for a Given Conversion in Plug Flow and Well Mixed Reactors For isothermal reactors with constant catalyst density being supplied with reactant at a volumetric rate F, the reactor volume (V) required for a given exit concentration or conversion is:

$$(1)\ \text{backmixed:}\ \frac{V_1}{F} = \frac{C_o - C_{exit}}{r_{exit}} = C_o \frac{J_e}{r_{exit}}$$

$$(2)\ \text{plug-flow:}\ -\frac{V_2}{F} = \int_{C_o}^{C_{exit}} \frac{dC}{r} = C_o \int_0^{J_e} \frac{dJ}{r}$$

where $$J = \frac{C_o - C}{C_o}$$

is the conversion,
$J_e$ is the exit conversion
r is the reaction rate
C is the concentration
$C_o$ is the inlet concentration.

Assuming first order kinetics (the HCS reaction order in total pressure is about 0.7), we find:

(1) backmixed $\dfrac{V_1}{F} = \dfrac{J_e}{k(1 - J_e)}$ (2) plug-flow $\dfrac{V_2}{F} = \dfrac{-1}{k} \ln(1 - J_e)$ where k is the reaction rate constant. Therefore, the ratio of volume requirements for a given conversion is:

$$\dfrac{V_1}{V_2} = \dfrac{J_e}{(1 - J_e)\ln(1 - J_e)}$$

As shown in FIG. 1, the required reactor volume is much less for the plug flow system at moderate or high conversions. A detailed model is available for calculating the effects of non-uniform catalyst distribution at intermediate mixing conditions for arbitrary kinetic expressions in specific applications.

EXAMPLE 2

Transition from Plug Flow to Backmixed Behavior

Figure 2:
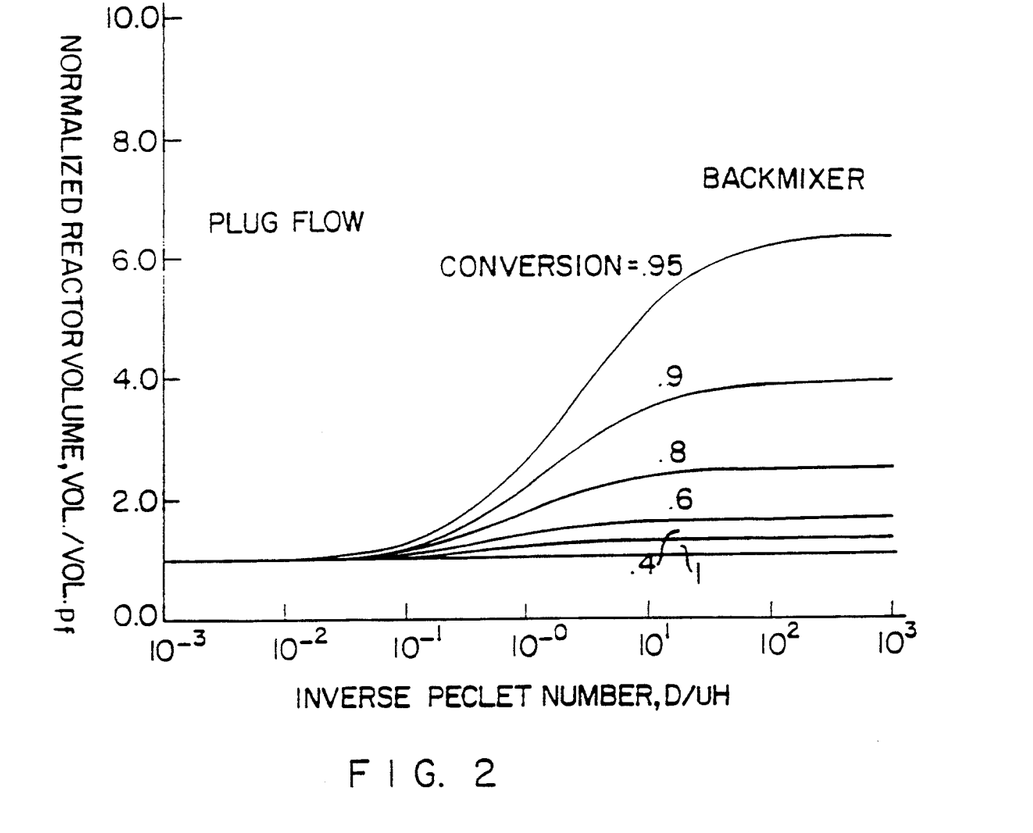
FIG. 2 shows a comparison of the reactor volume required to achieve different degrees of conversion of reactant to product as a function of degree of backmixing.

A given reactor generally exhibits behavior intermediate between plug-flow and well-mixed. For reaction rates that are first order in the concentration of reactants, the reactant concentration, C, at any vertical distance from bottom of the reactor, x, can be determined by solving the convection-diffusion equation:

$$U_g \dfrac{\partial C}{\partial x} - D \dfrac{\partial^2 C}{\partial x^2} = kC$$

where $U_g$ is the average velocity of the gas along the reactor, D is the gas phase dispersion coefficient, and k is the reaction rate constant. Defining $Z = x/H$ where H is the height of expanded liquid zone, this equation can be rewritten as:

$$\dfrac{\partial C}{\partial Z} - \dfrac{1}{Pe} \dfrac{\partial^2 C}{\partial Z^2} = \dfrac{kH}{U_g} C$$

where $Pe = HU_g/D$ is the Peclet number. As Pe approaches zero the dispersion dominates and the reactor is well-mixed, while as Pe approaches infinity, the dispersion becomes negligible and plug-flow behavior is achieved.

This model can be solved to determine the reactor volume necessary for a given conversion as a function of Peclet number. The results are plotted in FIG. 2. If the Peclet number is above 10, we see that effectively plug flow behavior is achieved and that the reactor volume requirements become independent of Peclet number.

EXAMPLE 3

Experimental Procedure to Determine the Dispersion in a Given Reactor

Example 2 demonstrates the importance of the Peclet number in determining the reactor performance. While calculating or measuring the reaction zone height and the gas velocity is relatively straightforward, it is difficult to know a priori the dispersion coefficient. The dispersion coefficient depends on the gas throughput velocity as well as on the reactor geometry. As the reactor diameter is increased, the dispersion increases rapidly. The problem is complicated by the need to provide internal reactor structures within the reactor in order to improve heat removal. A general correlation for the dispersion coefficient as a function of geometric configuration is not possible because different internal configurations will produce different and poorly understood mixing patterns. In fact, the geometry of the internal design is the key factor the designer can use to control the mixing behavior of a slurry bubble column reactor for a given outside diameter and height that are determined by volume requirements (i.e., by requirements to achieve a desired conversion).

The Peclet number of a given reactor can be determined from a tracer test for that reactor or a geometrically equivalent non-reactive mockup unit at milder but well defined conditions. Inert gas is fed to the bottom of the reactor and after allowing the system to equilibrate a small concentration of a tracer gas is added to the feed stream as a step function (cf. FIG. 3A). Then by measuring the shape of the concentration profile of the tracer in the gas outlet stream, the Peclet number can be determined for the reactor by matching experimental results to model calculations.

Figure 3A:
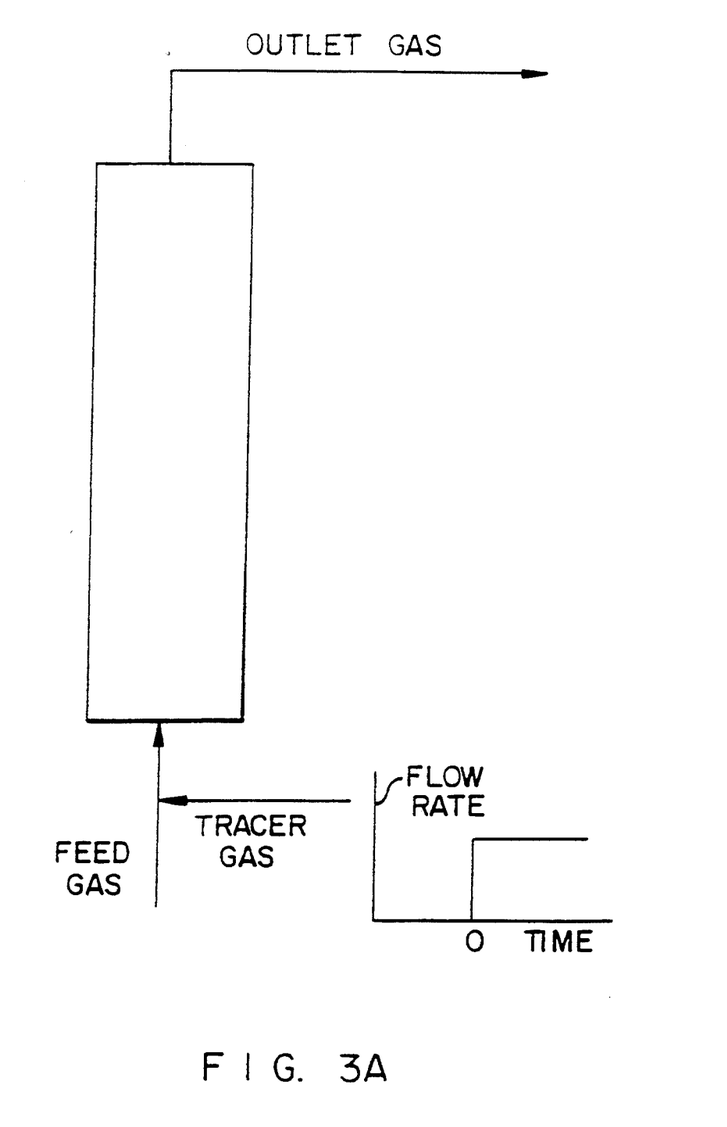
FIG. 3A shows a schematic diagram of a tracer test configuration designed to determine the extent of backmixing in a bubble column reactor.
Figure 3B:
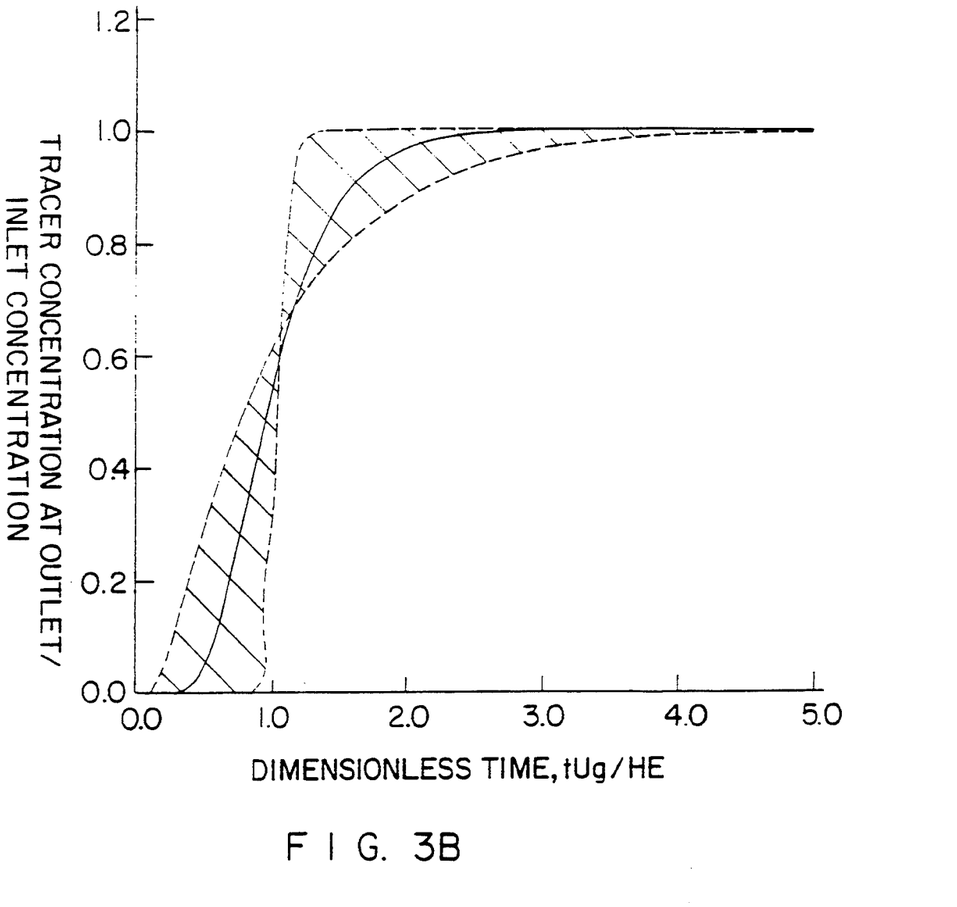
FIG. 3B shows the acceptable range for the tracer response in the effluent to guarantee Pe greater than 1 (i.e., plug flow behavior).

The model describing this test using a tracer that is insoluble in the liquid is:

$$\dfrac{\partial C}{\partial t} + \dfrac{\partial C}{\partial Z} - \dfrac{1}{Pe} \dfrac{\partial^2 C}{\partial Z^2} = 0$$

where t is the time measured from the tracer injection multiplied by $U_gH/E$ with E being the gas holdup in the column. The Peclet number is the only parameter in this equation. For infinitely large Peclet numbers (i.e., plug-flow), the output is a delayed step function; and as the Pe number is decreased (backmixing increases), the output response is more spread out in time. If the response pulse falls outside of the shaded area in FIG. 3B, the Peclet number is less than 1, and the reactor begins to give decreased conversion because of backmixing.

The same tests can be performed using a soluble tracer, but the required model and its interpretation of results are more complicated. The required procedure is obvious to those knowledgeable of the art and can yield additional information not germane to this invention.

EXAMPLE 4

Catalyst Distribution as a Function of Gas Velocity

Figure 4:
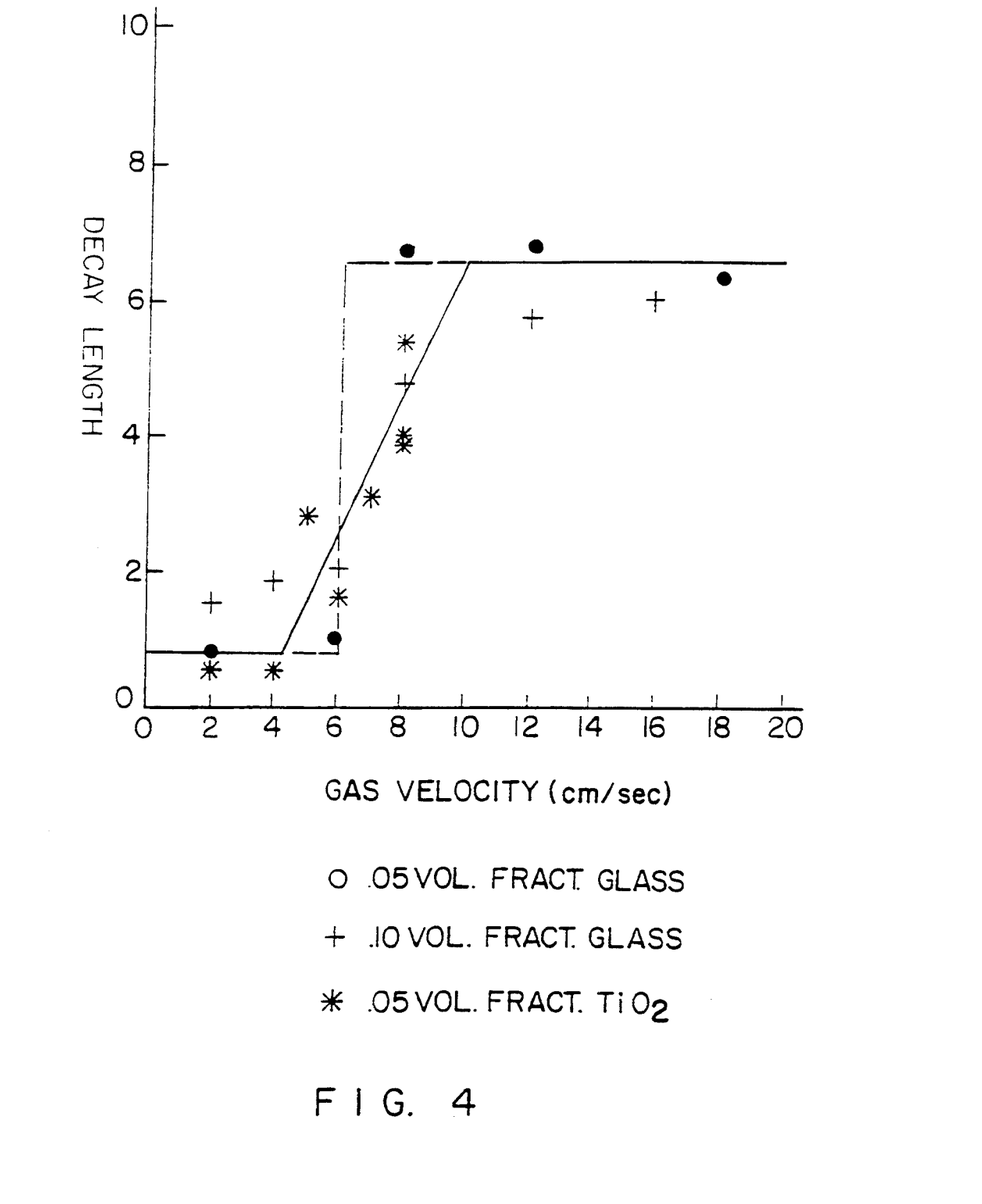
FIG. 4 shows the decay length of the solids concentration as a function of gas velocity for a 15 cm diameter by 5 meter tall non-reactive bubble column operating with hydrocarbon synthesis (HCS) wax and titania particles.

The catalyst distribution is determined by a balance of gravitational settling of the particles and dispersion created by the upward flow of the gas bubbles. This balance results in a profile of the catalyst concentration, $C_p$, given by:

$$C_p = A \exp\left[-x \dfrac{U_s - U_L}{D}\right]$$

where $U_s$ is the particle settling velocity, $U_L$ is the liquid velocity along the reactor, D is the dispersion coefficient of the liquid, x is the vertical distance from the bottom of the reactor, and A is a constant that depends on the total volumetric solids concentration in the reactor. The solids concentration decreases by a factor of 2.7 each time the height in the slurry increases by an amount equal to $D/(U_s-U_L)$. While $U_s$ is given primarily by the composition of the liquid and by the size and density of the catalyst particles, D is governed by the effective reactor diameter and by the gas velocity. FIG. 4 shows the decay length of the catalyst concentration as a function of gas velocity as measured in a 6 inch diameter by 5 meter tall non-reactive bubble column using Fischer-Tropsch wax and titania particles. These data demonstrate a ten-fold change in bed height (i.e., dispersion coefficient) over the velocity range of interest in commercial reactors (i.e., from 2-25 cm/sec). As discussed in Example 3, the qualitative form of this curve will remain the same but the decay lengths will be different for reactors with different diameters and internal structures because of their marked effect on the dispersion coefficient.

EXAMPLE 5

Experimentally Determined Solids Decay Length

Figure 5:
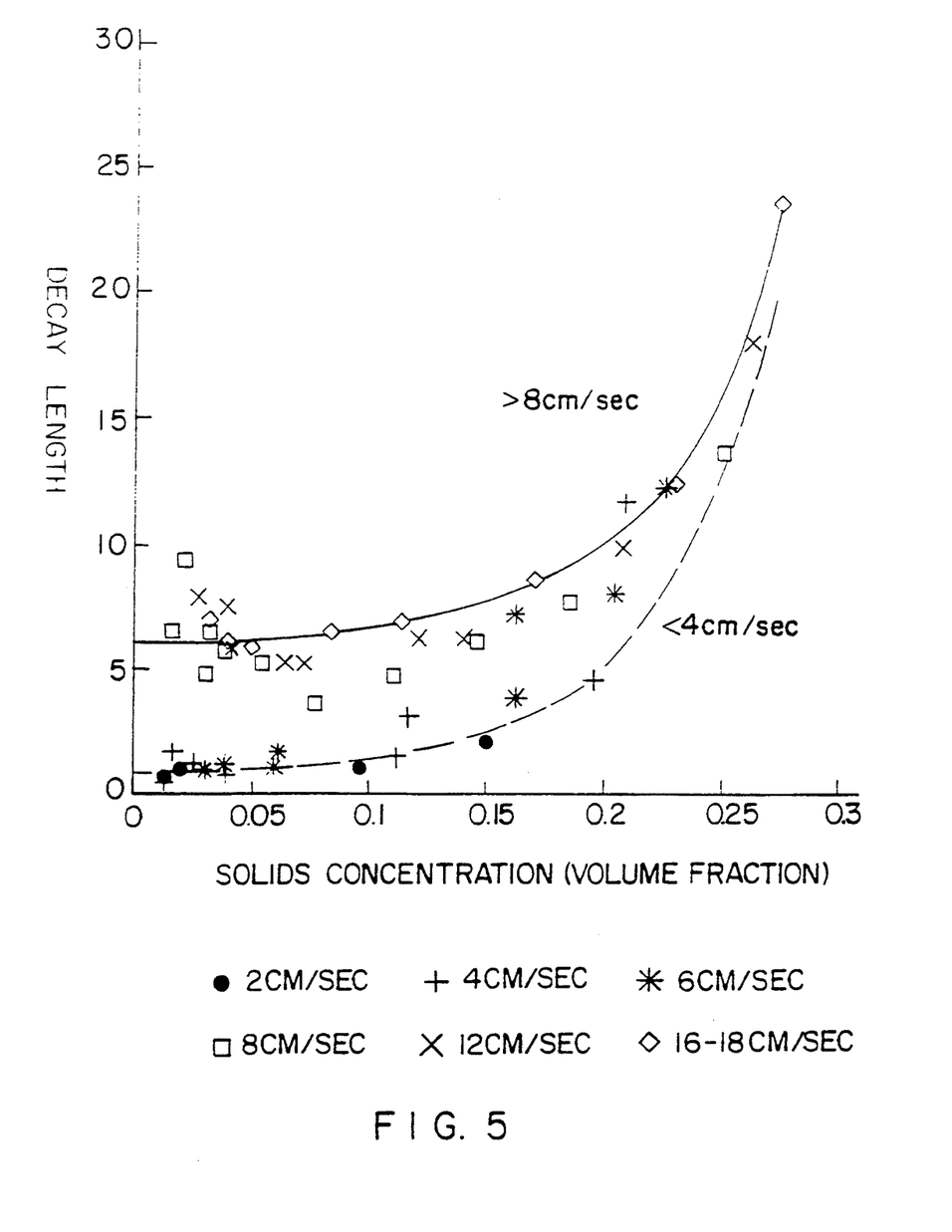
FIG. 5 shows the decay length of the solids concentration as a function of solids concentration for a 15 cm diameter non-reactive bubble column.

The solids distributions of glass beads and of titania particles in HCS wax were determined in a 6" diameter non-reactive bubble column by taking samples from the vessel at 1 meter intervals. The temperature was 400° F. and the pressure was 280 psig for gas velocities below 8 cm/sec and 150 psig for gas velocities above 8 cm/sec. The decay length was obtained by taking the slope of a line segment joining the data points when plotted as the logarithm of solids concentration versus height. In FIG. 5, the decay length in each zone is plotted versus the average concentration in the zone for superficial gas velocities of 2-16 cm/sec.

The data can be correlated reasonably by:

$D/U_s(\text{feet}) = 0.2(1 + 20C_p^2 + 3000C_p^4)/U_o(\text{cm/sec})$
for $U_g < 4$ cm/sec $D/U_s(\text{feet}) = 1.2(1 + 3C_p^2 + 550C_p^4)/U_o(\text{cm/sec})$ for $U_g > 8$ cm/sec where $C_p$ is the volume fraction of solids in the slurry and $U_o$ is the Stokes settling velocity defined by $$U_o = \frac{1}{18} d_p^2 \frac{\rho_s - \rho_l}{\mu} g$$

where $d_p$ is the diameter of the particle, $\rho_s$ is the density of the particle, $\rho_l$ is the density of the suspending liquid, $\mu$ is the viscosity of the liquid, and g is the gravitational constant. For velocities between 4 and 8 cm/sec a linear interpolation works well.

This demonstrates a marked increase in the fluidization height when the solids loading is increased above 20%. Most of this increase is due to a reduction in the particle settling velocity as the solids concentration increases (see R. H. Davis and A. Acrivos, Annual Review of Fluid Mechanics 17, 91, 1985).

EXAMPLE 6

Method for Predicting Solids Distribution in a Slurry Bubble Column Reactor

The data of Example 5 allow one to predict the catalyst distribution in a slurry bubble column reactor via the following algorithm. Suppose the reactor is charged with n species of particles each of which has a Stokes settling velocity $U_i$ and average concentration $C_{io}$. A given species may or may not be catalytic. The concentration of each species must satisfy the differential equation $$\frac{dC_i}{dx} = -U_i F(U_g, C_p) C_i$$

where x is the vertical distance from the bottom of the reactor, $F(U_g, C_p)$ is the function $D/U_s$ given in Example 5, $U_g$ is the gas velocity at height x, and $C_p$ is the local value of the total solids concentration (i.e., $C_p = \Sigma C_i$.

The algorithm begins by guessing the values of all the $C_i$'s at the bottom of the reactor and then the equations for the $C_i$'s are integrated numerically until the top of the slurry is reached. The gas velocity is computed by requiring a given overall conversion, J, and assuming the extent of reaction at any height is proportional to the fraction of the total catalyst inventory below that height.

When the integration reaches the top of the slurry, the total predicted inventory for each solid species is compared to the known charge; i.e., we check that $$C_{io} \int_o^H (1 - E) dx = \int_o^H (1 - E) C_i dx$$

where E is the volume fraction of gas (i.e., the gas holdup) at vertical distance x and H is the height of the slurry.

If these equalities are not satisfied, the assumed concentrations at the bottom of the reactor were not correct and they are adjusted using a Newton-Raphson iteration technique. The equations are then integrated starting from the new values and the iterations are continued until convergence is obtained.

This procedure can be easily extended to include the use of liquid flow along the reactor. The right hand side of the above equations are modified by subtracting the liquid velocity from the settling velocity of species i.

EXAMPLE 7

Determination of Operating Conditions for Slurry Reactors

Figure 6:
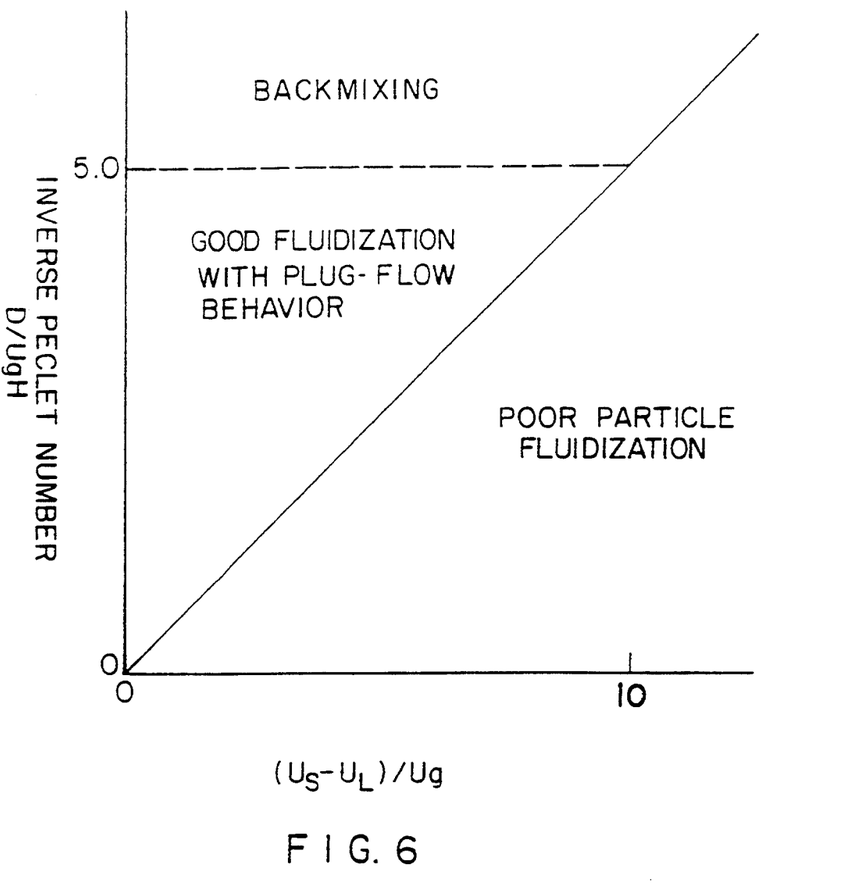
FIG. 6 shows the acceptable operating range in a slurry bubble column in $D/U_g L$ vs. $(U_s-U_L)/U_g$ parameter space.

As pointed out above, the dispersion coefficient should be large enough to fluidize the particles adequately over the height of the reactor, e.g.:

$$0.5 H \leq \frac{D}{U_s - U_L} \quad \text{or} \quad \frac{D}{H} \geq 0.5 (U_s - U_L)$$

but small enough that the gas flow remains plug flow, e.g.:

$$.2 \leq Pe = \frac{U_g H}{D} \quad \text{or} \quad \frac{D}{H} \leq 5 U_g$$

Together, these require an intermediate dispersion coefficient that satisfies the conditions:

$$5 U_g \geq \frac{D}{H} \geq 0.5 (U_s - U_L)$$

or $$5 \geq \frac{D}{H U_g} = \frac{1}{Pe} \geq \frac{0.5 (U_s - U_L)}{U_g}$$

Hence for optimum performance, the reactor geometry and operating conditions must be chosen such that they lie within the shaded triangle shown in FIG. 6.

EXAMPLE 8

Application to Fischer-Tropsch Synthesis with Co/Re Catalyst on Titania

Figure 7:
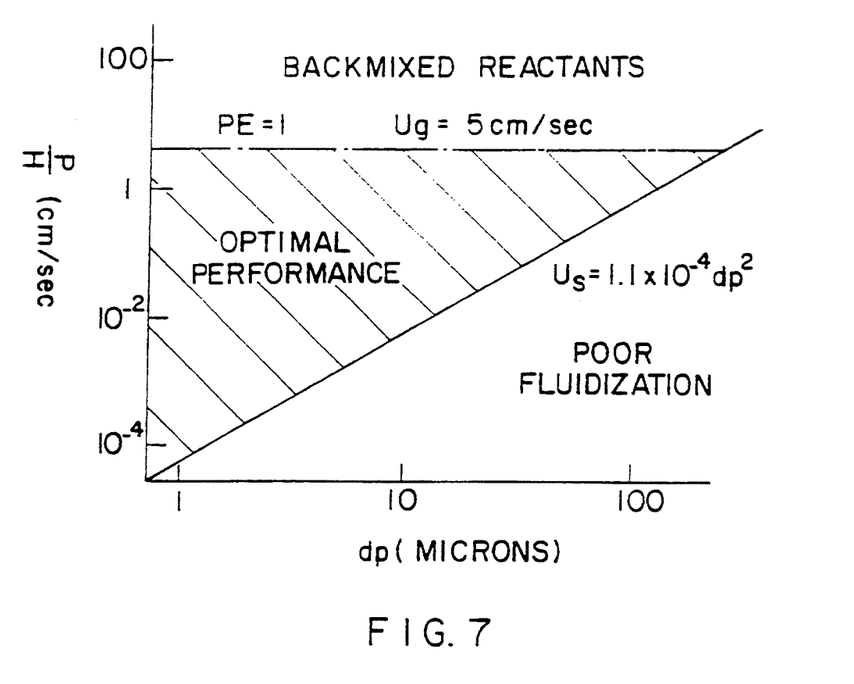
FIG. 7 shows the acceptable operating range for the Fischer-Tropsch catalyst/wax system in a slurry bubble column in $D/H$ vs. catalyst diameter parameter space.

For the catalyst/wax system being considered, the Reynolds number for the settling particles is small and $U_s$ is given by Stokes law times a monotonically decreasing function $[f(C_p)]$ which varies between 1 and 0 as the volume fraction of catalyst in the slurry is increased from 0 to the concentration at maximum packing. This "hindered settling function", is described in R. H. Davis and A. Acrivos, Annual Review of Fluid Mechanics 17 (1985). Hence, for the catalytic system of greatest interest $$U_s = \frac{1}{18} d_p^2 \frac{\rho_s - \rho_l}{\mu} g f(c) = 1.1 \times 10^{-4} d_p^2 f(c)$$

where $d_p$ is the particle diameter, $\rho_s$ is the effective density of the particles (approximately 2.7 gr/cm$^3$), $\rho_l$ is the density of the wax (0.7 gr/cm$^3$), $\mu$ is the viscosity of the wax (0.01 gr-cm/sec), g is the gravitational constant, c is the volume fraction of solids in the slurry, and f(c) is 1 for a dilute slurry and a monotonic decreasing function of solids volume fraction at higher solids loading. Hence, for our system:

$$U_s \text{ (cm/sec)} = 1.1 \times 10^{-4} [d_p \text{ (}\mu\text{m)}]^2$$

Assuming the gas phase Peclet number must be at least 2 to maintain plug flow behavior, the acceptable operating range is shown in FIG. 7 for the case where $U_g = 5$ cm/sec and no liquid recycle is used.

It is clear that while the D/H design range is quite broad for small particles because of our ability to fluidize such particles without extensive backmixing, this range narrows significantly for larger particles. Particles with greater than 100 μm diameters cannot be effectively fluidized without a backmixing debit on the kinetic driving force. Practical restrictions on the size of catalyst particles that can be effectively separated from the liquid medium by filtering, decantation, or other methods considerably narrow the allowable range of particle sizes and therefore design D/H parameters.

What is claimed is:

1. A method for optimally operating a large diameter three phase (gas, liquid, solid) slurry bubble column having a diameter greater than 15 cm for Fischer-Tropsch synthesis over a supported cobalt catalyst in which solid particles are fluidized in the liquid phase by bubbles of the gas phase, comprising:
   (a) injecting the gas phase into said column at an average gas velocity along said column, $U_g > 2$ cm/sec, such that the flow regime is in the substantial absence of slug flow;
   (b) fluidizing the solid supported cobalt catalyst particles of average diameter, $d_p > 5$ μm, to the height, $H > 3$m, of the expanded liquid in the column by operating with a catalyst settling velocity, $U_s$, and dispersion coefficient, D, such that $$0.5 (U_s - U_L) \leq \frac{D}{H}, \text{ where } H > 3 \text{ m}$$

where $$U_s = \frac{1}{18} d_p^2 \frac{\rho_s - \rho_l}{\mu} g f(C_p), \text{ where } d_p > 5 \text{ μm}$$

and
   (c) maintaining plug flow in said column by operating with a gas phase velocity, $U_g$, expanded liquid height, H, and dispersion coefficient, D, such that $$U_g \geq 0.2 D/H, \text{ where } H > 3\text{m}, U_g > 2 \text{ cm/sec}$$

wherein
   $\rho_s$ = effective density of the particles
   $\rho_l$ = density of the liquid
   $\mu$ = viscosity of the liquid
   $f(C_p)$ = hindered settling function
      = volume fraction of solids in the slurry (liquid plus solids)
   $U_L$ = liquid velocity along the column
   H = height of the expanded liquid in said reactor
   g = gravitational constant
   $d_p$ = diameter of particles
   m = meters.

2. The process of claim 1 wherein said supported catalysts comprises additional promoters selected from the group consisting of Group I, Group II, Group V, and Group VII metals.

3. The method of claim 1 wherein the stochiometric consumption ratio (H$_2$/CO) is between $$(1.8 - 2.2)H_2:CO.$$

4. The method of claim 3 wherein said support contains TiO$_2$, SiO$_2$, Al$_2$O$_3$, HfO$_2$, ZrO$_2$ or mixtures thereof.

5. The method of claim 4 wherein said catalyst further contains promotors selected from Group I, II, V and VII and combinations thereof of the periodic table.

6. The method of claim 5 wherein said catalyst comprises Co, on a TiO$_2$ support.

7. The method of claim 1 wherein said liquid phase is the indigenous product generated in the CO hydrogenation reaction.

8. The method of claim 1 wherein said liquid is hydrocarbon synthesis wax, said solid is a supported cobalt suitable for the synthesis of such wax at typical Fischer-Tropsch conditions, and $U_s = 1.1 \times 10^{-4}$ d.

9. The method of claim 1 wherein said gas velocity, $U_g \geq 1$ D/H.

10. The method of claim 9 wherein said gas velocity, $U_g \geq 10$ D/H.

11. The method of claim 1 wherein said catalyst particles have a diameter greater than 30 microns.

12. The method of claim 1 wherein H is greater than 10 meters.

13. The method of claim 1 wherein $U_L \leq \frac{1}{2} U_s$.

14. The method of claim 1 wherein $U_L \leq 0.5$ cm/second.

15. The method of claim 7 wherein $U_L$ is determined in the absence of liquid recycle.

16. The method of claim 1 wherein said bubble column diameter is greater than 20 cm.

* * * * *